US012767901B2

(12) United States Patent
Butts et al.

(10) Patent No.: US 12,767,901 B2
(45) Date of Patent: Oct. 20, 2026

(54) SOLUBLE WATER SCAVENGER MOLECULES FOR USE WITH DIELECTRIC FLUIDS

(71) Applicant: General Electric Technology GmbH, Baden (CH)

(72) Inventors: Matthew David Butts, Niskayuna, NY (US); Weijun Yin, Niskayuna, NY (US); Jingjing Yang, Niskayuna, NY (US); Jie Jerry Liu, Niskayuna, NY (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 915 days.

(21) Appl. No.: 17/676,033

(22) Filed: Feb. 18, 2022

(65) Prior Publication Data

US 2023/0265349 A1 Aug. 24, 2023

(51) Int. Cl.
*C10G 33/04* (2006.01)
*H01F 27/12* (2006.01)
(Continued)

(52) U.S. Cl.
CPC ........... *C10G 33/04* (2013.01); *H01F 27/125* (2013.01); *H01F 27/14* (2013.01); *H01F 27/32* (2013.01)

(58) Field of Classification Search
None
See application file for complete search history.

(56) References Cited

U.S. PATENT DOCUMENTS 3,796,934 A * 3/1974 Munch .................. H01G 4/221 252/574
5,229,454 A * 7/1993 Weichmann ....... C08G 18/0885 528/53

(Continued)

FOREIGN PATENT DOCUMENTS

CN 209840561 U 12/2019
CN 112635165 A 4/2021

(Continued)

OTHER PUBLICATIONS

English abstract of WO-2008111535-A1 (Year: 2008).*

(Continued)

*Primary Examiner* — Mark Eashoo
*Assistant Examiner* — M. Reza Asdjodi
(74) *Attorney, Agent, or Firm* — Eversheds Sutherland (US) LLP

(57) ABSTRACT

Soluble water scavenger molecules for use with dielectric fluids are disclosed. An example dielectric fluid-based composition for reducing water content in a dielectric fluid may include a water-scavenging agent disposed within a dielectric fluid. The example dielectric fluid-based composition may further include the water-scavenging agent being soluble in the dielectric fluid. The example dielectric fluid-based composition may further include the water-scavenging agent being configured to react with water molecules in the dielectric fluid. The example dielectric fluid-based composition may be disposed in an electrical equipment immersed in oil. The electrical equipment may further include at least one solid insulation in operational contact with the dielectric fluid.

12 Claims, 5 Drawing Sheets

(51) Int. Cl.
*H01F 27/14* (2006.01)
*H01F 27/32* (2006.01)

(56) References Cited

U.S. PATENT DOCUMENTS

| | | | | |
|---|---|---|---|---|
| 6,398,986 | B1 * | 6/2002 | McShane | H01F 27/125<br>174/17 LF |
| 9,601,230 | B2 * | 3/2017 | Nair | A23D 9/00 |
| 2013/0152626 | A1 * | 6/2013 | Feng | C09K 5/045<br>252/570 |
| 2015/0243406 | A1 * | 8/2015 | Nair | H01B 3/20<br>252/579 |
| 2015/0243407 | A1 * | 8/2015 | Nair | H01B 3/20<br>252/579 |
| 2015/0248947 | A1 * | 9/2015 | Nair | H01B 3/20<br>252/579 |
| 2021/0234476 | A1 | 7/2021 | Reed et al. | |
| 2023/0265349 | A1 * | 8/2023 | Butts | H01F 27/32<br>174/14 R |

FOREIGN PATENT DOCUMENTS

| | | | | | |
|---|---|---|---|---|---|
| CN | 107760249 | B | | 5/2021 | |
| DE | 2703110 | A | * | 8/1977 | |
| EP | 2603569 | B1 | * | 7/2018 | C09K 5/045 |
| GB | 1568684 | A | * | 6/1980 | C10M 1/08 |
| SU | 1754202 | A1 | | 8/1992 | |
| WO | WO-2010128523 | A4 | * | 2/2011 | B01D 53/52 |

OTHER PUBLICATIONS

International Search Report and Written Opinion for PCT/IB2023/051466, dated Aug. 2, 2023, 19 pages.

Cybulski et al.: Application of Molecular Sieves for Drying Transformers Insulated with Mineral Oil, Natural Ester, or Synthetic Ester. Energies. 2021; 14(6):1719. Mar. 19, 2021.

Fofana et al.: Drying of transformer insulation using zeolite. IEEE Electrical Insulation Magazine, vol. 20, No. 1, pp. 20-30, Jan.-Feb. 2004. Aug. 2, 2004.

Partial International Search Report and Opinion for PCT/IB2023/051466, dated May 8, 2023, 8 pages.

* cited by examiner

SOLUBLE WATER SCAVENGER MOLECULES FOR USE WITH DIELECTRIC FLUIDS

GOVERNMENT LICENSE RIGHTS

This invention was made with U.S. government support under DE-AR0001391 awarded by the U.S. Department of Energy. The U.S. government may have certain rights in the invention.

FIELD OF DISCLOSURE

The present disclosure is related to soluble water scavenger molecules, and more particularly to soluble water scavenger molecules for use with dielectric fluids.

BACKGROUND

Systems and methods for removing water molecules from a dielectric fluid may involve external apparatuses for treating the dielectric fluids. However, the use of external apparatuses may be inconvenient for a user, particularly in circumstances where a dielectric fluid needs to be periodically treated to remove water molecules. An in-situ solution for removing water molecules from a dielectric fluid may thus be critical to ensure convenient periodic treatment of dielectric fluids to remove water molecules.

BRIEF DESCRIPTION OF THE DRAWINGS

The detailed description is set forth with reference to the accompanying drawings. The drawings are provided for purposes of illustration only and merely depict exemplary embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
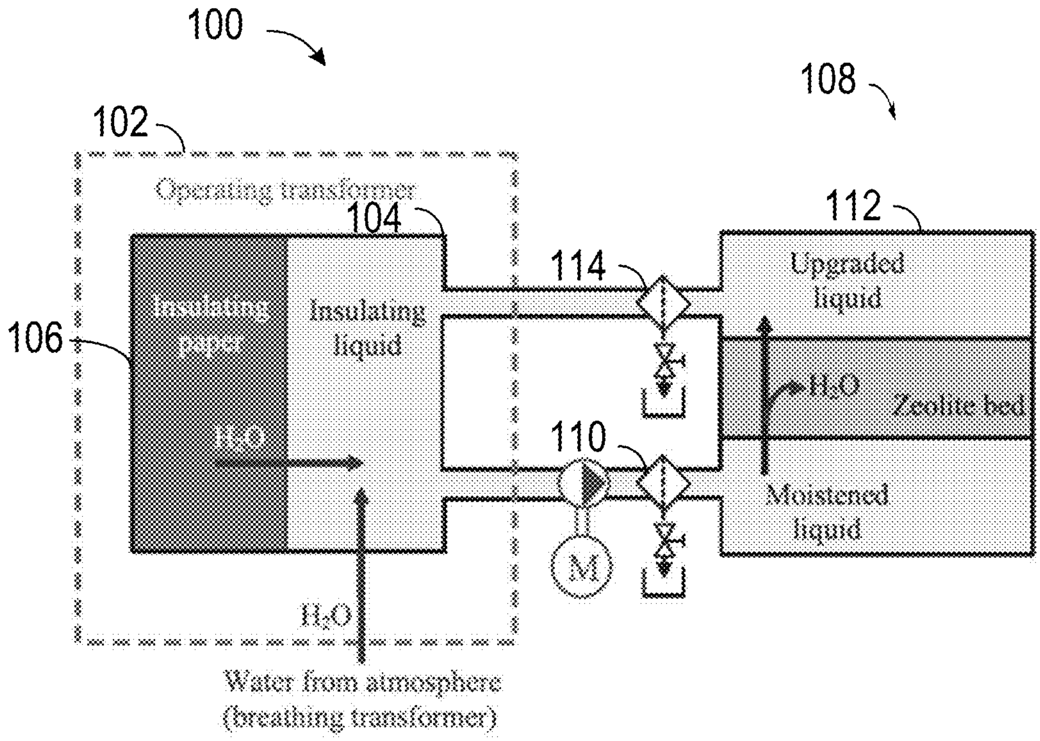
FIG. 1 depicts an example water treatment system, in accordance with one or more example embodiments of the disclosure.

This disclosure relates to, among other things, soluble water scavenger molecules for use with dielectric liquids. In one or more embodiments, a dielectric fluid-based composition for reducing water content in a dielectric fluid may include a water-scavenging agent disposed within a dielectric fluid. In some embodiments, the water-scavenging agent may be soluble in the dielectric fluid. In some embodiments, the water-scavenging agent may be configured to react with water molecules in the dielectric fluid.

In one or more embodiments, the dielectric fluid-based composition described herein may improve upon current methods for reducing water content in a dielectric fluid by using soluble water-scavenging molecules. By adding soluble water-scavenging molecules to a dielectric fluid, the water content in the dielectric fluid may be reduced without the use of external apparatuses. This may mitigate the need for external apparatuses and may be more convenient for periodic treatment of a dielectric fluid over time. This technical solution thus allows for an in-situ solution for reducing water content in a dielectric fluid.

In one or more embodiments, the dielectric fluid-based composition may include a water-scavenging agent that is an organic substance. In one or more embodiments, the water-scavenging agent may be one of an enamine, an orthoester, an alkoxysilane, or an oxazolidine. In one or more embodiments, the enamine may be one of 1-morpholinocyclohexene, 1-morpholinocyclopentene, 1-piperidinocyclohexene, 1-pyrrolidino-1-cyclohexene, or 1-pyrrolidino-1-cyclopentene. In one or more embodiments, the water-scavenging agent may have a flash point of at least about 68 degrees Fahrenheit (about 20 degrees Celsius).

In one or more embodiments, the dielectric fluid may be an oil. In one or more embodiments, the oil may be one of an n-alkane-based paraffinic mineral oil, a cycloalkane-based naphthenic mineral oil, an aromatic-based mineral oil, a natural ester-based oil, a synthetic ester-based oil, or a silicone-based oil. In one or more embodiments, the dielectric fluid may further include at least one additive for anti-oxidation or acid-scavenging.

In one or more embodiments, the water-scavenging agent may be further configured to react with water molecules in at least one solid insulation material that is in operational contact with the dielectric fluid.

In one or more embodiments, a system disclosed herein may include electrical equipment immersed in oil. The electrical equipment may include a dielectric fluid, at least one solid insulation in operational contact with the dielectric fluid, and a water-scavenging agent disposed within the dielectric fluid. In some embodiments, the water-scavenging agent may be soluble in the dielectric fluid. In some embodiments, the water-scavenging agent may be configured to react with water molecules in at least a portion of the at least one solid insulation and the dielectric fluid.

In one or more embodiments, the electrical equipment may be a power transformer. In one or more embodiments, the at least one solid insulation may include cellulose paper.

In one or more embodiments, a method for reducing water content in a dielectric fluid may be disclosed herein. In one or more embodiments, the method may include adding a first predetermined volume of a water-scavenging agent into a second predetermined volume of a dielectric fluid. In one or more embodiments, the method may further include dissolving the first predetermined volume of the water-scavenging agent in the second predetermined volume of the dielectric fluid to form a concentrate. In one or more embodiments, the method may further include diluting the concentrate with a third predetermined volume of the dielectric fluid until a predetermined concentration of the water-scavenging agent is reached, wherein the third predetermined volume of the dielectric fluid is disposed within an electrical equipment. In other embodiments, the method may include adding a predetermined volume of the water-scavenging agent directly to a volume of the dielectric fluid which was previously added to the electrical equipment. In one or more embodiments, the method may further include causing at least one reaction between the water-scavenging agent and at least one water molecule disposed within the dielectric fluid, wherein the at least one reaction results in the at least one water molecule and the water-scavenging agent being irreversibly transformed into at least one byproduct.

In one or more embodiments, the method may further include causing at least one reaction between the water-scavenging agent and at least one water molecule in at least one solid insulation that is in operational contact with the dielectric fluid.

FIG. 1 depicts an example water treatment system 100, in accordance with one or more example embodiments of the disclosure.

In one or more embodiments, an electrical equipment 102 may include dielectric fluid 104 and at least one solid insulation 106. Over time, water molecules may accumulate in the dielectric fluid 104. The water molecules may accumulate in the dielectric fluid 104 based at least in part due to water molecules from the at least one solid insulation 106 and water molecules from the atmosphere entering the dielectric fluid 104.

In one or more embodiments, the dielectric fluid 104 may be channeled into an external apparatus 108 in order to treat the dielectric fluid 104 to remove water molecules. In some embodiments, the dielectric fluid 104 may be channeled away from the electrical equipment 102 through a first tube 110. The dielectric fluid 104 may be passed through a chamber 112 having a solid water sorbent. The water molecules in the dielectric fluid 104 may then be removed when the dielectric fluid 104 is passed through the solid water sorbent, and the treated dielectric fluid 104 may then be channeled back into the electrical equipment 102 via a second tube 114. In some embodiments, the solid water sorbent may be, for example, a zeolite.

In one or more embodiments, the water treatment system 100 may require external apparatuses in order to remove water molecules from the dielectric fluid 104.

Figure 2:
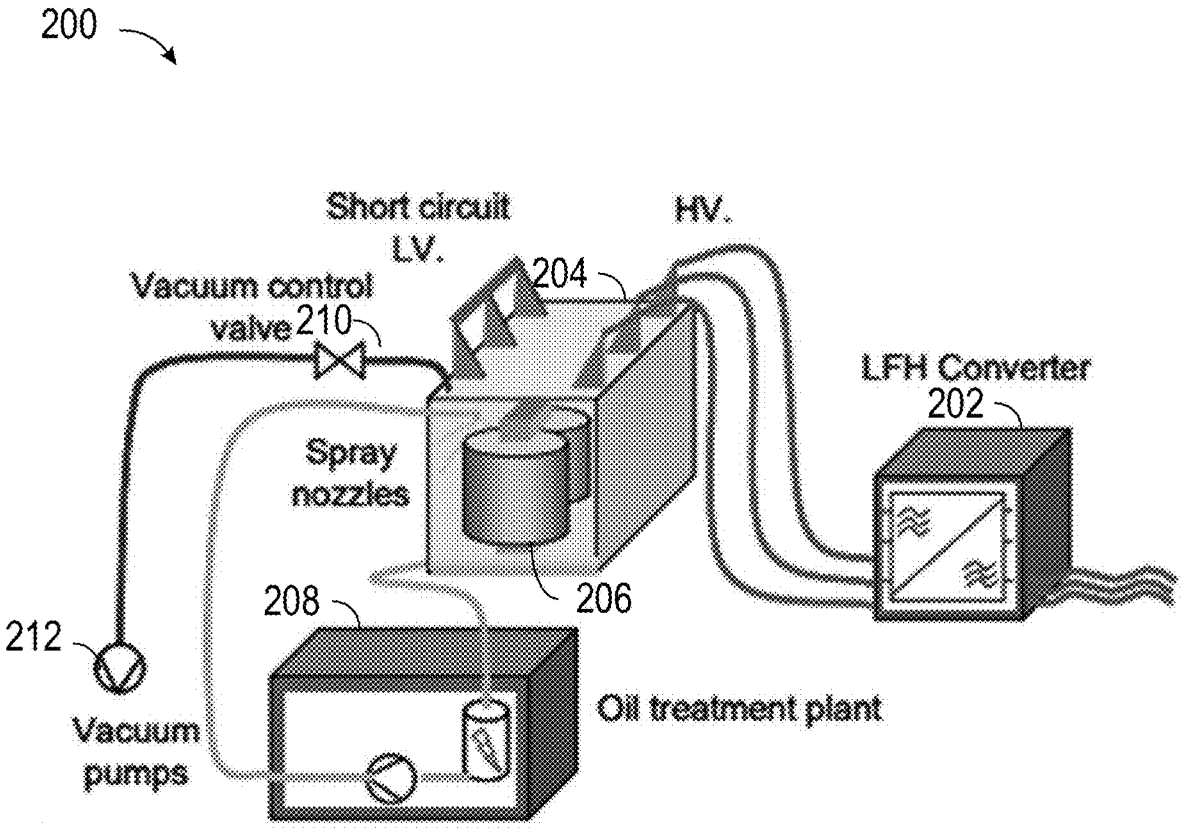
FIG. 2 depicts an example water treatment system, in accordance with one or more example embodiments of the disclosure.

FIG. 2 depicts an example water treatment system 200, in accordance with one or more example embodiments of the disclosure.

In one or more embodiments, a water treatment system 200 may include a vacuum and heating technique. In one or more embodiments, the existing water treatment system 200 may include an external apparatus. For example, the water treatment system 200 may involve a low-frequency heating converter 202 that is connected to a high voltage side of a transformer 204. The low voltage side of the transformer 204 may be short circuited. The transformer 204 may include spray nozzles 206 that are connected to an oil treatment plant 208. The transformer 204 may be further connected to a vacuum control valve 210 that is connected to at least one vacuum pump 212.

In one or more embodiments, the water treatment system 200 may require external apparatuses and the application of additional heat in order to remove water molecules from a dielectric fluid.

Figure 3:
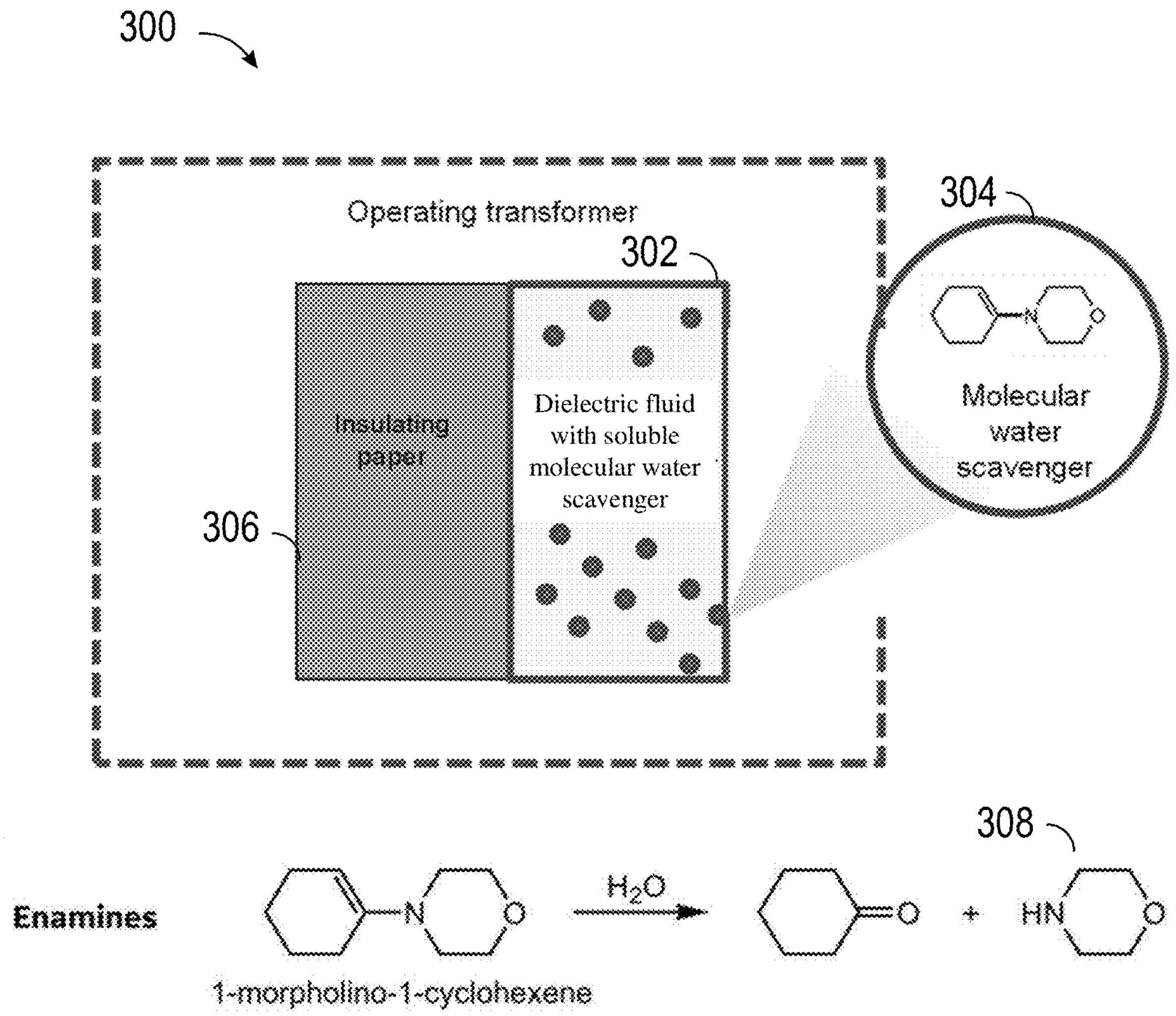
FIG. 3 depicts an example electrical equipment that uses a dielectric fluid-based composition, in accordance with one or more example embodiments of the disclosure.

FIG. 3 depicts an example electrical equipment 300 that uses a dielectric fluid-based composition, in accordance with one or more example embodiments of the disclosure.

In one or more embodiments, the electrical equipment 300 may be immersed in oil (or another dielectric fluid) 302 during service. This may result in the existence of water in the oil (or another dielectric fluid) 302 due to water ingress from environments to which the oil (or another dielectric fluid) is exposed, diffusion, or extraction of water from any solid insulation into the oil (or another dielectric fluid), or from thermal degradation of any solid insulation present in the oil (or another dielectric fluid) 302, or any combination thereof. The existence of water in the oil (or another dielectric fluid) 302 may then result in a reduction in breakdown voltage of the oil (or another dielectric fluid) 302. Thus, in one or more embodiments, in-situ drying of the oil (or another dielectric fluid) 302 may be performed in order to reduce the quantity of water in the oil (or another dielectric fluid) 302.

In one or more embodiments, soluble water scavenger molecules 304 may be added to the oil (or another dielectric fluid) 302 in order to perform drying. Soluble water scavenger molecules 304 may improve the reduction in breakdown voltage of the oil (or another dielectric fluid) 302 by reducing the quantity of water in the oil (or another dielectric fluid) 302, reduce the rate of degradation of the solid insulation by reducing the rate of hydrolysis, and, in some embodiments, reducing the acidity of the oil (or another dielectric fluid) 302 and the solid insulation, thus additionally stabilizing the electrical equipment. In some embodiments, the quantity of water may be correlated to the quantity of soluble water scavenger molecules 304 that have been added. In some embodiments, the quantity of water may be reduced by at least about 50%. In some embodiments, the quantity of water may be reduced by at least about 70%. In some embodiments, the quantity of water after the addition of the soluble water scavenger molecules 304 may be reduced to under about 200 ppm, and preferably under about 100 ppm for ester oils and under about 10 ppm for mineral oils. In some embodiments, the breakdown voltage may be improved by the addition of the soluble water scavenger molecules 304, such that the breakdown voltage may be approximate to the breakdown voltage of dried oil (or another dried dielectric fluid). Additionally, the use of the soluble water scavenger molecules 304 may remove the moisture in the solid insulation that is in contact with the oil (or another dielectric fluid) 302. Furthermore, the use of the soluble water scavenger molecules 304 may remove the need for using additional equipment to dry an electric insulation system.

In one or more embodiments, the soluble water scavenger molecules 304 may each be comprised of two or more atoms held together by chemical bonds. The soluble water scavenger molecules 304 may have a neutral charge. In some embodiments, the soluble water scavenger molecules 304 may be a chemical without any repeat units. In other embodiments, the soluble water scavenger molecules 304 may be a chemical with two repeat units, which may be known as a dimer. In other embodiments, the soluble water scavenger molecules 304 may be a chemical with more than two repeat units, which may be known as a macromolecule.

As depicted in FIG. 3, the soluble water scavenger molecules 304 are soluble in the oil (or another dielectric fluid) 302. Solubility may refer to the ability of the soluble water scavenger molecules 304 to dissolve in a continuous phase, also called a solvent, present in the liquid state so as to form a solution. Solutions may refer to homogeneous mixtures, composed of two or more substances, that are optically clear. The solubility of a substance may therefore refer to the degree to which a substance is soluble in a continuous phase. Solubility may be complete, also called miscible when the substance is a liquid, or partial. In some embodiments, the solubility of the soluble water scavenger molecules 304 in the oil (or another dielectric fluid) 302 may be greater than about 10 ppm at room temperature. In other embodiments, the solubility of the soluble water scavenger molecules 304 in the oil (or another dielectric fluid) 302 may be greater than 100 ppm at room temperature. In other embodiments, the solubility of the soluble water scavenger molecules 304 in the oil (or another dielectric fluid) 302 may be greater than about 1000 ppm at room temperature. In other embodiments, the soluble water scavenger molecules 304 may be miscible with the oil (or another dielectric fluid) 302. In some embodiments, the soluble water scavenger molecules 304 may react with water molecules in the oil (or another dielectric fluid) 302.

In one or more embodiments, the electrical equipment 300 may further include at least one solid insulation 306 in operational contact with the oil (or another dielectric fluid) 302. In some embodiments, the at least one solid insulation 306 may comprise a cellulose paper. In some embodiments, the soluble water scavenger molecules 304 may also react with water molecules in the at least one solid insulation 306 in order to reduce the quantity of water molecules present in the at least one solid insulation 306.

In one or more embodiments, a concentrate may be first formed by dissolving the soluble water scavenger molecules 304 in a first amount of the oil (or another dielectric fluid) 302. This concentrate may then be subsequently diluted with another amount of the oil (or another dielectric fluid) 302 in order to reach a desired concentration of the soluble water scavenger molecules 304. The process of dilution may occur when the concentrate is added to the oil (or another dielectric fluid) 302 that the electrical equipment 300 is immersed in. In some embodiments, the soluble water scavenger molecules 304 may be added with heat. In other embodiments, a predetermined amount of the soluble water scavenger molecules 304 may be added directly to the oil (or another dielectric fluid) 302 that already has the electrical equipment 300 immersed in it. These particular embodiments may be particularly suited for soluble water scavenger molecules 304 that are miscible in the oil (or another dielectric fluid) 302. When the soluble water scavenger molecules 304 react with water molecules in the oil (or another dielectric fluid) 302, for example, in reaction 308 as depicted in FIG. 3, at least two byproducts may be produced, neither of which are water molecules. The byproducts may be inert chemical species. In some embodiments, the byproducts may be amines, which may reduce the acidity of the oil (or another dielectric fluid) 302 and the at least one solid insulation 306.

In one or more embodiments, the soluble water scavenger molecules 304 may be added at regular or irregular time intervals in order to reduce the existence of water in the oil (or another dielectric fluid).

In one or more embodiments, the electrical equipment 300 may be a high voltage application such as a power transformer, a capacitor, an electric machine, power electronics, high voltage cables, a switchgear, or other suitable electrical equipment.

In one or more embodiments, the oil (or another dielectric fluid) 302 may be an electrically non-conductive liquid that has a relatively high resistance to electrical breakdown when subjected to a high voltage over a wide service temperature range. In some embodiments, the service temperature may range from about −40 degrees Fahrenheit to about 356 degrees Fahrenheit. In other embodiments, the service temperature range may range from about −4 degrees Fahrenheit to about 302 degrees Fahrenheit. In some embodiments, examples of oils 302 include an n-alkane-based paraffinic mineral oil, a cycloalkane-based naphthenic mineral oil, an aromatic-based mineral oil, a natural ester-based oil, a synthetic ester-based oil, or a silicone-based oil. In some embodiments, the oil (or another dielectric fluid) 302 may further include at least one additive for anti-oxidation (or oxygen-scavenging) or acid-scavenging (or acid-intercepting) purposes.

Figure 4:
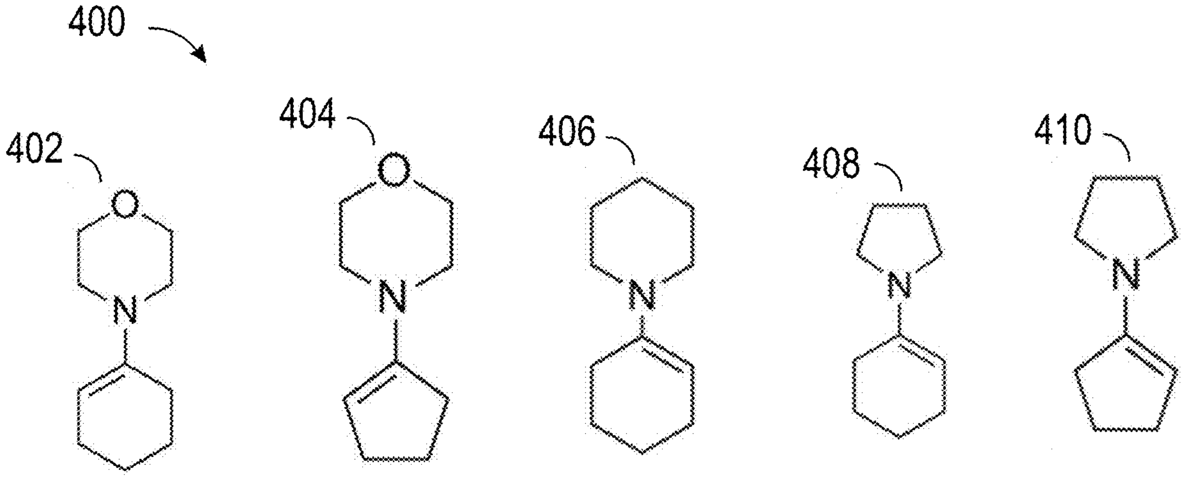
FIG. 4 depicts example soluble water scavenger molecules, in accordance with one or more example embodiments of the disclosure.

FIG. 4 depicts example soluble water scavenger molecules 400 in accordance with one or more example embodiments of the disclosure.

In one or more embodiments, the soluble water scavenger molecules 400 that may be used to reduce the quantity of water in an oil (or another dielectric fluid) may include enamines, orthoesters, alkoxysilanes, oxazolidines, structures that comprise these chemical units, or mixtures thereof. In some embodiments, a variety of soluble water scavenger organic enamine molecules may be used to reduce the quantity of water in an oil or another dielectric fluid, for example, the oil or another dielectric fluid in electrical equipment 300, as depicted in FIG. 3. Examples of enamines may include 1-morpholinocyclohexene 402, 1-morpholinocyclopentene 404, 1-piperidinocyclohexene 406, 1-pyrrolidino-1-cyclohexene 408, 1-pyrrolidino-1-cyclopentene 410, and other applicable enamines. The enamines may include a molecule having the N—C=C functional group. Other applicable enamines may be soluble in a dielectric fluid and may be susceptible to hydrolysis reactions at room temperature or higher temperatures. In some embodiments, enamines that are susceptible to hydrolysis reactions at room temperature or higher temperatures may be enamines having ring strain or other enhanced reactivity. Examples of orthoesters may include triethylorthoacetate, triethylorthoformate, trimethylorthoacetate, trimethylorthoformate, and other applicable orthoesters. In some embodiments, the soluble water scavenger molecules 400 may have a flash point of at least 68 degrees Fahrenheit.

In one or more embodiments, the soluble water scavenger molecules 400 may be configured to react with water irreversibly at room temperature and temperatures higher than room temperature. In some embodiments, the chemical reaction involving the soluble water scavenger molecules 400 may have an equilibrium constant of greater than about 10. In one embodiment, the soluble water scavenger molecules 400 may be involved in a hydrolysis reaction such that water molecules are consumed as a reactant. Such an irreversible hydrolysis reaction may result in two smaller molecules being formed.

In one or more embodiments, the dielectric fluid and the soluble water scavenger molecules 400 may form a dielectric fluid composition. The soluble water scavenger molecules 400 may be soluble in the dielectric fluid, and the soluble water scavenger molecules 400 may be configured to react with water molecules in the dielectric fluid. In one or more embodiments, the concentration of soluble water scavenger molecules 400 may vary based on the dielectric fluid present. The concentration of soluble water scavenger molecules 400 may be configured to prevent a reduction in breakdown voltage, thermal conductivity, or flash point of the dielectric fluid composition by more than approximately about 10% at room temperature when compared to the dielectric fluid that does not comprise the soluble water scavenger molecules 304 but is otherwise exposed to the same conditions. The concentration of soluble water scavenger molecules 400 may be further configured to prevent the pour point from increasing beyond a predetermined minimum temperature. For example, if the dielectric fluid is a mineral oil, the pour point may be configured to not exceed −40 degrees Fahrenheit (−40 degrees Celsius). As another example, if the dielectric fluid is a natural ester oil, the pour point may be configured to not exceed about −4 degrees Fahrenheit (−20 degrees Celsius). In some embodiments, if the dielectric fluid is a mineral oil, the concentration of soluble water scavenger molecules 400 may be configured to be approximately 0.5% by weight. In other embodiments, if the dielectric fluid is a mineral oil, the concentration of soluble water scavenger molecules 400 may be configured to be approximately 0.25% by weight. In some embodiments, if the dielectric fluid is a natural ester oil, the concentration of soluble water scavenger molecules 400 may be up to approximately 5% by weight. In other embodiments, if the dielectric fluid is a natural ester oil, the concentration of soluble water scavenger molecules 400 may be approximately 2% by weight. In some embodiments, the concentration of soluble water scavenger molecules 400 may be approximately 2.5 molar equivalents as compared to the concentration of water present in the dielectric fluid. In other embodiments, the concentration of soluble water scavenger molecules 400 may be approximately 10 molar equivalents as compared to the concentration of water present in the dielectric fluid.

Figure 5:
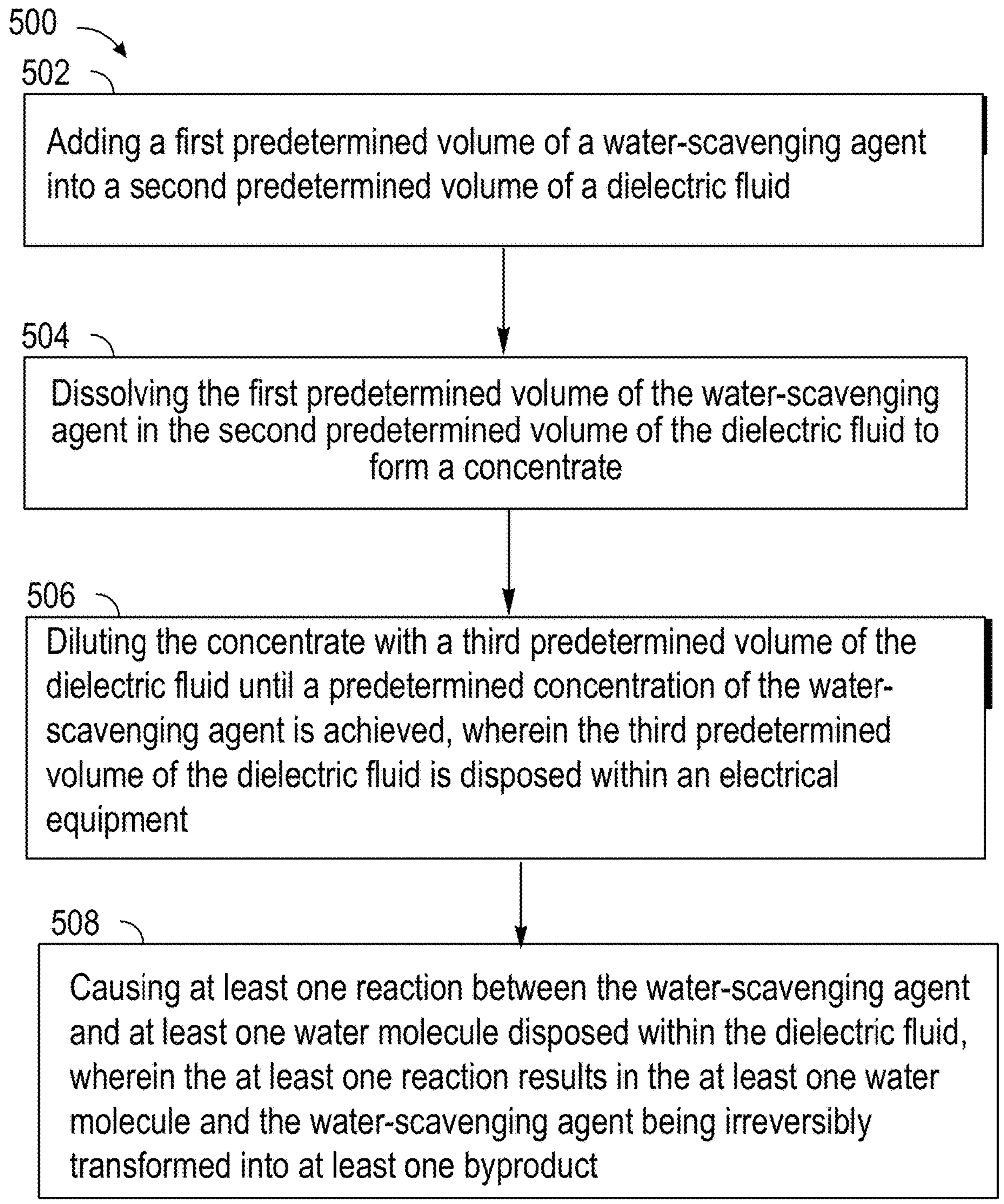
FIG. 5 is an example process flow diagram of an illustrative method, in accordance with one or more example embodiments of the disclosure.

FIG. 5 is an example process flow diagram of an illustrative method 500. At block 502, the method 500 may include adding a first predetermined volume of a water-scavenging agent into a second predetermined volume of a dielectric fluid. At block 504, the method 500 may include dissolving the first predetermined volume of the water-scavenging agent in the second predetermined volume of the dielectric fluid to form a concentrate. At block 506, the method 500 may include diluting the concentrate with a third predetermined volume of the dielectric fluid until a predetermined concentration of the water-scavenging agent is reached, wherein the third predetermined volume of the dielectric fluid is disposed within an electrical equipment. At block 508, the method 500 may include causing at least one reaction between the water-scavenging agent and at least one water molecule disposed within the dielectric fluid, wherein the at least one reaction results in the at least one water molecule and the water-scavenging agent being irreversibly transformed into at least one byproduct.

The method 500 may further include causing at least one reaction between the water-scavenging agent and at least one water molecule in at least one solid insulation in operational contact with the dielectric fluid.

In one or more embodiments, the dielectric fluid and the water-scavenging agent may form a dielectric fluid-based composition. The water-scavenging agent may be soluble in the dielectric fluid, and the water-scavenging agent may be configured to react with water molecules in the dielectric fluid.

In one or more embodiments, the water-scavenging agent may be an organic substance. The water-scavenging agent may be an enamine, an orthoester, an alkoxysilane, or an oxazolidine. If the water-scavenging agent is an enamine, the enamine may preferably be 1-morpholinocyclohexene, 1-morpholinocyclopentene, 1-piperidinocyclohexene, 1-pyrrolidino-1-cyclohexene, or 1-pyrrolidino-1-cyclopentene.

In one or more embodiments, the water-scavenging agent may have a flash point of at least 68 degrees Fahrenheit.

In one or more embodiments, the dielectric fluid may be an oil. The oil may be an n-alkane-based paraffinic mineral oil, a cycloalkane-based naphthenic mineral oil, an aromatic-based mineral oil, a natural ester-based oil, a synthetic ester-based oil, or a silicone-based oil.

In one or more embodiments, the dielectric fluid-based composition may further include at least one additive for anti-oxidation or acid-scavenging.

In one or more embodiments, the dielectric fluid, at least one solid insulation in operational contact with the dielectric fluid, and a water-scavenging agent disposed within the dielectric fluid may be disposed within an electrical equipment that is immersed in oil. The electrical equipment may be a power transformer. The at least one solid insulation may be cellulose paper.

The operations described and depicted in the illustrative process flow of FIG. 5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 5 may be performed. For example, in some embodiments, the water-scavenging agent may be added directly to a dielectric fluid into which the electrical equipment has already been immersed.

One or more operations of the process flow of FIG. 5 may have been described above as being performed manually or by a user device, or more specifically, by one or more program modules, applications, or the like executing on a device. It should be appreciated, however, that any of the operations of process flow of FIG. 5 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

It is understood that the above descriptions are for purposes of illustration and are not meant to be limiting.

Although specific embodiments of the disclosure have been described, numerous other modifications and embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or operations. Thus, such conditional language is not generally intended to imply that features, elements, and/or operations are in any way required for one or more embodiments.

That which is claimed is:

1. A dielectric fluid-based composition for reducing water content in a dielectric fluid, the composition comprising:

the dielectric fluid;

water present in an amount of less than about 10 ppm; and a water-scavenging agent comprising at least one of 1-morpholinocyclohexene, 1-morpholinocyclopentene, 1-piperidinocyclohexene, 1-pyrrolidino-1-cyclohexene, or 1-pyrrolidino-1-cyclopentene disposed within the dielectric fluid, wherein the dielectric fluid is a mineral oil, wherein the water-scavenging agent is present in the dielectric fluid in an amount of at least 2.5 molar equivalents as compared to the water in the dielectric fluid, wherein the water-scavenging agent is soluble in the dielectric fluid, and wherein the water-scavenging agent is configured to react with water molecules in the dielectric fluid.

2. The dielectric fluid-based composition of claim 1, wherein the water-scavenging agent has a flash point of at least 68 degrees Fahrenheit.

3. The dielectric fluid-based composition of claim 1, wherein the dielectric fluid comprises an oil selected from at least one of: an n-alkane-based paraffinic mineral oil, a cycloalkane-based naphthenic mineral oil, or an aromatic-based mineral oil.

4. The dielectric fluid-based composition of claim 1, wherein the water-scavenging agent is further configured to react with water molecules in one or more solid insulations in operational contact with the dielectric fluid.

5. The dielectric fluid-based composition of claim 1, wherein the dielectric fluid comprises at least one additive for anti-oxidation or acid-scavenging.

6. A system comprising:

an electrical equipment immersed in oil, the electrical equipment comprising:

a dielectric fluid;

water present in an amount of less than about 10 ppm;

at least one solid insulation in operational contact with the dielectric fluid; and a water-scavenging agent comprising at least one of 1-morpholinocyclohexene 1-morpholinocyclopentene, 1-piperidinocyclohexene, 1-pyrrolidino-1-cyclohexene, or 1-pyrrolidino-1-cyclopentene disposed within the dielectric fluid, wherein the dielectric fluid is a mineral oil, wherein the water-scavenging agent is present in the dielectric fluid in an amount of at least 2.5 molar equivalents as compared to the water in the dielectric fluid, wherein the water-scavenging agent is soluble in the dielectric fluid, and wherein the water-scavenging agent is configured to react with water molecules in at least a portion of the at least one solid insulation and the dielectric fluid.

7. The system of claim 6, wherein the water-scavenging agent has a flash point of at least 68 degrees Fahrenheit.

8. The system of claim 6, wherein the electrical equipment comprises a power transformer, and wherein the dielectric fluid comprises an oil selected from at least one of: an n-alkane-based paraffinic mineral oil, a cycloalkane-based naphthenic mineral oil, or an aromatic-based mineral oil, and wherein the at least one solid insulation comprises cellulose paper.

9. The system of claim 6, wherein the dielectric fluid comprises at least one additive for anti-oxidation or acid-scavenging.

10. A method of reducing water content in a dielectric fluid, comprising:

adding a first predetermined volume of a water-scavenging agent into a second predetermined volume of a dielectric fluid, the water-scavenging agent comprising at least one of 1-morpholinocyclohexene 1-morpholinocyclopentene, 1-piperidinocyclohexene, 1-pyrrolidino-1-cyclohexene, or 1-pyrrolidino-1-cyclopentene, wherein water is present in the dielectric fluid in an amount of less than about 10 ppm;

dissolving the first predetermined volume of the water-scavenging agent in the second predetermined volume of the dielectric fluid to form a concentrate;

diluting the concentrate with a third predetermined volume of the dielectric fluid until a predetermined concentration of the water-scavenging agent is reached, wherein the third predetermined volume of the dielectric fluid is disposed within an electrical equipment, and wherein the predetermined concentration of the water-scavenging agent is determined such that the water-scavenging agent is present in the dielectric fluid in an amount of at least 2.5 molar equivalents as compared to a water concentration in the dielectric fluid; and causing at least one reaction between the water-scavenging agent and at least one water molecule disposed within the dielectric fluid, wherein the at least one reaction results in the at least one water molecule and the water-scavenging agent being irreversibly transformed into at least one byproduct, wherein the dielectric fluid is a mineral oil.

11. The method of claim 10, wherein the dielectric fluid comprises an oil selected from at least one of: an n-alkane-based paraffinic mineral oil, a cycloalkane-based naphthenic mineral oil, or an aromatic-based mineral oil.

12. The method of claim 10, wherein the at least one reaction is at least one first reaction, and further comprising:

causing at least one second reaction between the water-scavenging agent and at least one water molecule in at least one solid insulation in operational contact with the dielectric fluid.

* * * * *